United States Patent Office.

MAX WINDSPERGER, OF 125 SAFFRON HILL, HOLBORN, COUNTY OF MIDDLESEX, ASSIGNOR TO CHARLES TUCHMANN, OF 10b SAINT THOMAS STREET BOROUGH HIGH STREET, COUNTY OF SURREY, ENGLAND.

FIRE-EXTINGUISHING COMPOUND.

SPECIFICATION forming part of Letters Patent No. 240,799, dated April 26, 1881.

Application filed February 21, 1881. (No model.)

*To all whom it may concern:*

Be it known that I, MAX WINDSPERGER, a subject of the King of Bavaria, residing at 125 Saffron Hill, Holborn, in the county of Middlesex, England, have invented certain new and useful Improvements in Solutions for Extinguishing and Preventing Rekindling of Fires, of which the following is a specification.

This invention relates to a liquid compound for extinguishing fire, giving a fire-proof character to substances materially combustible, and thus preventing rekindling of a fire in substances which have been treated with the compound for the purpose of extinguishing fire therein.

My improved compound consists, generally, of five ingredients, in the following approximate proportions, viz: Water, twenty-five gallons; common salt, fifteen pounds; alum, preferably powdered, one and one-fourth pound; silicate of sodium, twenty-eight pounds; red chalk, one-fourth pound.

In preparing the compound I place the water in a cask, and add to it first the salt and then the alum, these ingredients being then thoroughly mixed and left to stand for about two hours, in order that the salt and alum may be thoroughly dissolved. I then add the silicate of soda, stirring the mixture briskly at the same time, and finally mix in thoroughly the red chalk, when the compound is completed and ready for use, and will instantly extinguish fire in the most inflammable substances, even petroleum and benzoline.

The hand, after being immersed in the liquid compound, may be placed for a short time in a flame without being burned.

Being free from acid, the compound may be applied by means of any utensil without injury to the same, the quantity required being very much less than that required of water, the proportion being about as one of the compound to ten of water.

The compound will bear any degree of cold without freezing, and may be stored for years without losing its efficiency.

I am aware that silicate of soda or water-glass has heretofore been used in fire-proof compounds, and such, broadly, is not claimed by me.

What I claim is—

1. A fire-extinguishing and fireproofing compound composed of water, common salt, alum, silicate of soda, and red chalk, substantially as described.

2. A fire-extinguishing and fireproofing compound composed of water, common salt, alum, and silicate of soda, substantially as described.

Dated this 12th day of January, 1881.

MAX WINDSPERGER.

Witnesses:
   ADOLPHUS SELVIN,
*Of 21 Mincing Lane, in the City of London, Solicitor of the Supreme Court of Judicature in England.*
   WM. BLACKWELL,
*Of 35 Bullen Street, Battersea Park Road, Battersea, in the County of Surrey, England, Solicitor's Clerk.*